United States Patent Office 3,446,979
Patented May 27, 1969

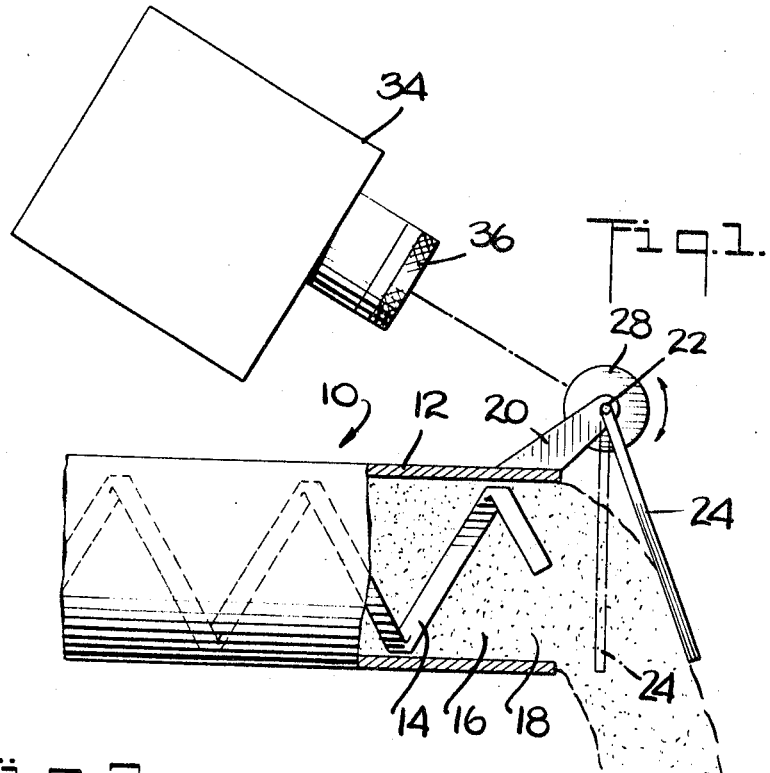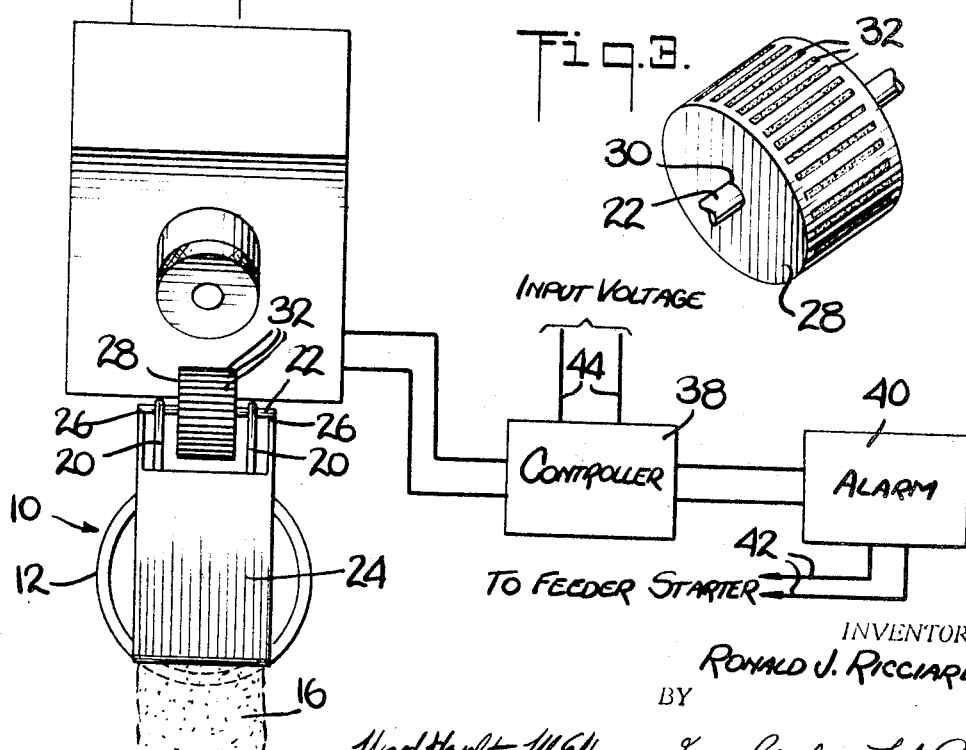

3,446,979
FLOW INDICATOR FOR DIVIDED SOLID MATERIAL PROVIDED WITH INDICIA RESPONSIVE PHOTOELECTRIC MEANS
Ronald J. Ricciardi, 193 MacArthur Ave., Garfield, N.J. 07026
Filed July 20, 1965, Ser. No. 473,392
Int. Cl. G01d 5/34; H01j 39/12; G08b 21/00
U.S. Cl. 250—231       4 Claims

ABSTRACT OF THE DISCLOSURE

A flow indicator for divided solid material including a container having an outlet, and a paddle mounted in the outlet in the path of the flowing material. The paddle has indicia thereon which moves responsive to the flow of material, and a photoelectric cell is focused on this indicia. A control circuit is connected to the photoelectric cell, and hence transmits a signal responsive to the flow of material.

---

This invention has to do with material flow indicators and more particularly with a material flow indicator which indicates flowing movement of dry divided solid material such as inter alia, powders, flakes, granules, or fibers from a vessel, container, trough, tube or conveyor which may be either moving or stationary. The device is not intended to measure the quantity of flow, but is intended to indicate whether there is flow or no flow of material from a container of the aforementioned character.

The device according to this invention is particularly useful as a so-called "fail safe" device and finds application in conjunction with material feeding or conveying machines, for example. That is, in the event that the material should fail to discharge from the feeding machine, the device according to this invention senses the lack of flow and sounds an alarm or stops the machine.

A feature of the invention resides in the provision of new and improved apparatus which is substantially less expensive and simpler than apparatus deemed necessary for indicating the flow of dry divided solid material from a container, whereby apparatus components and manipulative operations are eliminated as compared to practices of the prior art.

Another feature of the invention is the provision of apparatus having greatly increased operating life without repairs, and reduced down time for repairs and replacement of parts as compared to prior such devices.

Still another feature of the invention resides in the provision of new and improved apparatus for indicating flowing movement of dry divided solid material from a container or vessel which requires no moving parts except paddle means to sense the material flow, and which is far superior to existing devices for indicating the flow of material of a particle size such as tends to jam and block mechanical indicating and measuring members of existing flow indicator mechanisms.

According to one form of the invention, the material flow indicator comprises a container having an outlet through which dry divided solid material flows. A freely swinging paddle means such as a pivotally mounted flapper plate is mounted on the container adjacent the outlet, whereby the flapper is disposed in the path of the flowing material. Indicia such as a plurality of spaced lines are applied to the mounting means and are movable with the paddle means responsive to the flow of material. A photoelectric cell is disposed in communication with the indicia and a control circuit is connected to such photo cell to transmit a signal responsive to movement of the indicia, thereby indicating material flow or lack of flow from the container.

According to a modified form of my present invention, I provide a material flow indicator which comprises a container having an outlet through which the dry solid divided material is flowable. Bracket means are disposed adjacent said container, and an elongated shaft is mounted on the bracket means. A freely rotatable paddle wheel is mounted on the shaft adjacent the container so that the paddles thereof are in the path of the flowing material, thereby causing rotation of the shaft when the material is flowing from the container. A generator is mounted on said shaft co-axially with respect to the paddle wheel, and it is adapted to generate electrical impulses or current responsive to rotation of the shaft. An indicator circuit is in communication with the generator to indicate the generation of current corresponding to the flow or no flow of material from the container.

Other objects and advantages will be apparent from the following description of several embodiments of the invention, and the novel features will be particularly pointed out hereinafter in connection with the appended claims.

In the accompanying drawing:

FIG. 1 is a side elevation, partially in section showing a material flow indicator according to the invention;

FIG. 2 is a front elevation of the flow indicator of FIG. 1, and includes a schematic illustration of the electrical circuitry;

FIG. 3 is an enlarged perspective view of the cylindrical member having indicia thereon;

Figure 4:
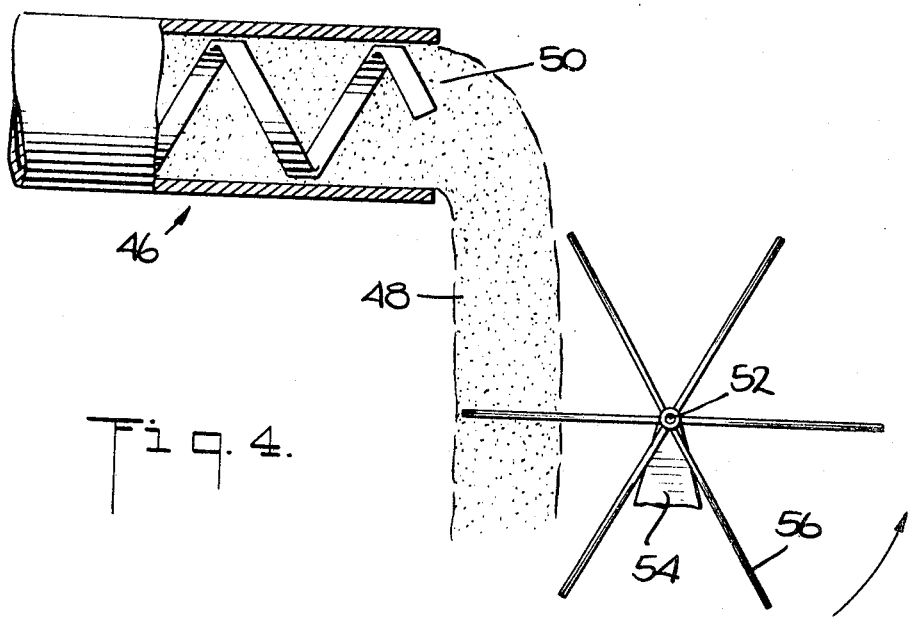
FIG. 4 is a side elevation, partially in section, of a modified form of the invention.

In the embodiment of the invention illustrated in FIGS. 1–3, the material flow indicator includes a container such as a conveyor or screw feeding device indicated generally at 10 and having a wall member 12 and an internal screw 14 which causes the flow of material 16 through the outlet 18 thereof. Mounted on the wall 12 are a pair of support brackets 20, upon which a shaft 22 is mounted for rotation. A freely swinging paddle means, such as paddle or flapper plate 24 is fixedly mounted on the shaft 22 as at 26, FIG. 2. As best seen in FIG. 1, the flapper plate is disposed adjacent the outlet 18 of the container 10 in the path of the flow of material 16 therefrom.

A cylindrical member 28 is also rigidly mounted on the shaft 22 as at 30, FIG. 3. This member has applied to the surface thereof indicia or markings to which a photoelectric cell responds. The indicia may take the form of a plurality of spaced lines 32 clearly applied or marked on the surface of the member 28. Preferably these lines are disposed in substantially parallel relationship one with respect to the other and in parallel relationship with respect to the axis of the cylindrical member. As shown in FIG. 3, the indicia may take the form of a plurality of spaced strips of reflector tape applied to the peripheral surface of the cylindrical member 28.

As seen in FIGS. 1 and 2, a photoelectric cell 34 is positioned in proximity to the other members of the device. The photoelectric cell 34 is provided with a lens 36 focused on the cylindrical member 28 and more particularly focused on the lines or tapes 32. In operation the feeder or conveyor 10 discharges material 16 through the opening 18. This material impinges on the paddle means or plate 24 causing the paddle to move from the position indicated by the broken lines in FIG. 1 to the position indicated by the solid lines in FIG. 1. It should be appreciated that the paddle means is fabricated of light weight material, and hence, requires very little force of the material 16 impinging thereon to cause movement thereof. This movement causes rotation of the shaft 22 and, as seen in FIG. 2, rotation of the shaft 22 causes a like rotation of the cylindrical member 28. The rotation of the cylindrical member 28 and movement of the lines or tapes 32 causes interruptions of the reflection of the light ray emitted by the photoelectric cell 34. The movement of these lines, which may be as slight as 1/16 inch or 1/8 inch and either constant or intermittent, is sensed by the photoelectric cell. In the event that the intermittent interrupion of the light ray received by the photoelectric cell should cease for a predetermined period of time such as from about 10 to about 30 seconds, for example, caused by a lack of movement of the paddle means 24 corresponding to a stoppage of material flow, the photoelectric cell 34 senses this condition and the controller 38 actuates an alarm 40. The alarm 40 may be connected to the feeder or conveyor for stopping the operation of same, if desired. It is noted that input voltage is supplied to the controller 38 through lines 44, FIG. 3, provided for the purpose.

Figure 5:
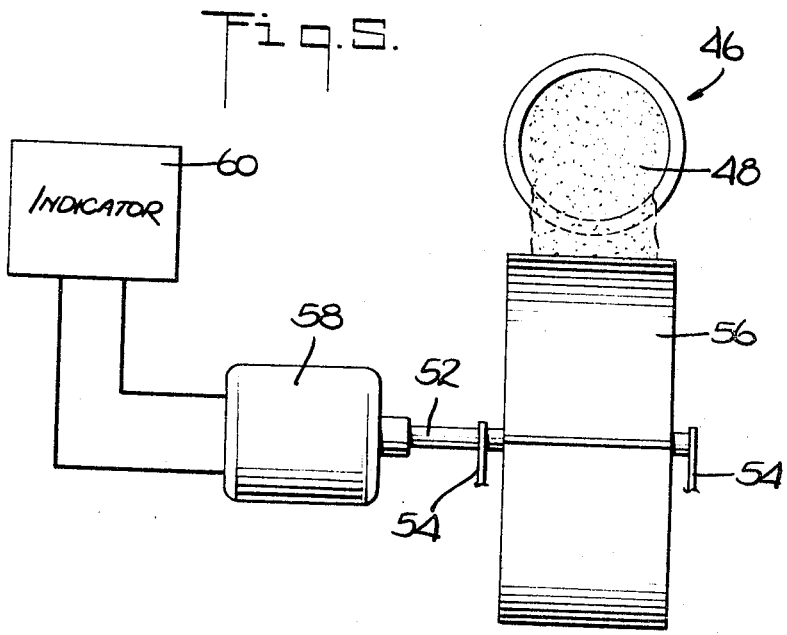
FIG. 5 is a front elevation of the flow indicator according to FIG. 4, and includes a schematic illustration of the electrical circuitry.

Referring to the modified form of the invention as shown in FIGS. 4 and 5, the material flow indicator comprises a container indicated generally at 46 for feeding dry solid divided material 48 through an outlet 50. An elongated shaft 52 is mounted on brackets 54 disposed adjacent the container 46. A paddle wheel 56 is fixedly mounted on the shaft 52 so that the blades or paddles are positioned in the path of the flowing material 48, whereby the paddle wheel is rotated by the movement of the flowing material. As seen in FIG. 5, a miniature generator 58 is coaxially or directly connected to the shaft 52 so that rotation of the paddle wheel 56 causes rotation of the generator 58, and thereby causes the generator 58 to generate a small electrical current. It will be appreciated that the miniature generator 58 and the paddle wheel 56 are fabricated from light weight materials and accordingly very little force is required to actuate same, thereby causing only slight resistance to the flow of material 48. A cessation of rotation of the paddle wheel 56, due to a cessation of the flow of material 48, causes an absence of current generation by the generator 58. This is indicated by the associated indicator 60, FIG. 5. Should the interruption of current flow persist for a period of time, such as from about 10 to about 30 seconds, for example, the indicator 60 closes or opens a relay (not shown) which activates an alarm or shut down the entire machine.

From the foregoing description, it will be seen that I contribute by my invention a new and improved material flow indicator for use in combination with a conventional conveyor or feeding machine which is simple and inexpensive in construction, which is reliable in operation, and which does not interfere with the normal functioning of the conveyor or feeder mechanism.

It will be understood that various changes in the details, materials and arrangements of parts which have been herein described and illustrated in order to explain the nature of the invention, may be made by those skilled in the art within the principle and scope of the invention, as expressed in the appended claims.

I claim:
1. A material flow indicator comprising a container having an outlet through which dry divided solid material is flowable, freely swinging paddle means, means mounting said paddle means adjacent said outlet in the path of flowing material, one set of idicia applied to said mounting means movable with the paddle means responsive to flow of the material, a fixedly mounted photoelectric cell in communication with said indicia, and a control circuit connected to said photoelectric cell to transmit a signal responsive to movement of said indicia.

2. A material flow indicator comprising a container having an outlet through which dry divided solid material is flowable, a paddle plate, first means for pivotally mounting said paddle plate adjacent the outlet of said container and in the path of the flowing material, one set of linear markings applied to said first means, a fixedly mounted photoelectric cell in communication with said linear markings, and a control circuit connected to said photoelectric cell to transmit a signal responsive to movement of said linear markings.

3. A material flow indicator comprising a container having an outlet through which dry divided solid material is flowable, a member having a convex curvature surface portion, a paddle plate rigidly connected to said member and disposed substantially coaxially therewith, means pivotally mounting said paddle plate adjacent said outlet in the path of the flowing material, said member having a plurality of linear markings applied to said convex curvature surface portion and extending in a generally transverse direction with respect to the direction of flow of said material, said member being movable responsive to flow of the material due to impact of said material against said paddle plate, a fixedly mounted photoelectric cell focused on said linear markings, and a control circuit connected to said photoelectric cell to transmit a signal responsive to movement of said linear markings.

4. A material flow indicator comprising a container having an outlet through which dry divided solid material is flowable, bracket means mounted on said container, a cylindrical member pivotally mounted on said bracket means, a paddle plate rigidly connected to said member and disposed substantially coaxially therewith, said paddle plate extending into the path of the flowing material whereby the impact of the flowing material thereagainst causes pivotal movement of said cylindrical member, a plurality of spaced parallel lines applied to said cylindrical member and extending substantially parallel to the cylinder axis, a fixedly mounted photoelectric cell being focused on said lines, and a control circuit connected to said photoelectric cell to transmit a signal responsive to movement of said lines.

References Cited

UNITED STATES PATENTS

| | | | |
|---|---|---|---|
| 410,502 | 9/1889 | Donner | 340—239 |
| 2,586,540 | 2/1952 | Holden | 250—230 X |
| 2,803,448 | 8/1957 | Biebel | 250—231 X |

FOREIGN PATENTS 788,313 12/1957 Great Britain.

JAMES W. LAWRENCE, Primary Examiner.

V. LAFRANCHI, Assistant Examiner.

U.S. Cl. X.R.

250—223; 340—239

PO-1050
(5/69)

UNITED STATES PATENT OFFICE
CERTIFICATE OF CORRECTION

Patent No. 3,446,979            Dated May 27, 1969

Inventor(s) R.J. Ricciardi

It is certified that error appears in the above-identified patent and that said Letters Patent are hereby corrected as shown below:

Column 4, line 2, before the word "flowing" insert --the--; line 12 after the word "material" insert --said first means being movable responsive to flow of the material,--.

SIGNED AND
SEALED

OCT 21 1969

(SEAL)
Attest:

Edward M. Fletcher, Jr.
Attesting Officer

WILLIAM E. SCHUYLER, JR.
Commissioner of Patents